S. S. CROCKER & A. WILCOX.
Foot-Bath for Horses.
No. 204,482. Patented June 4, 1878.
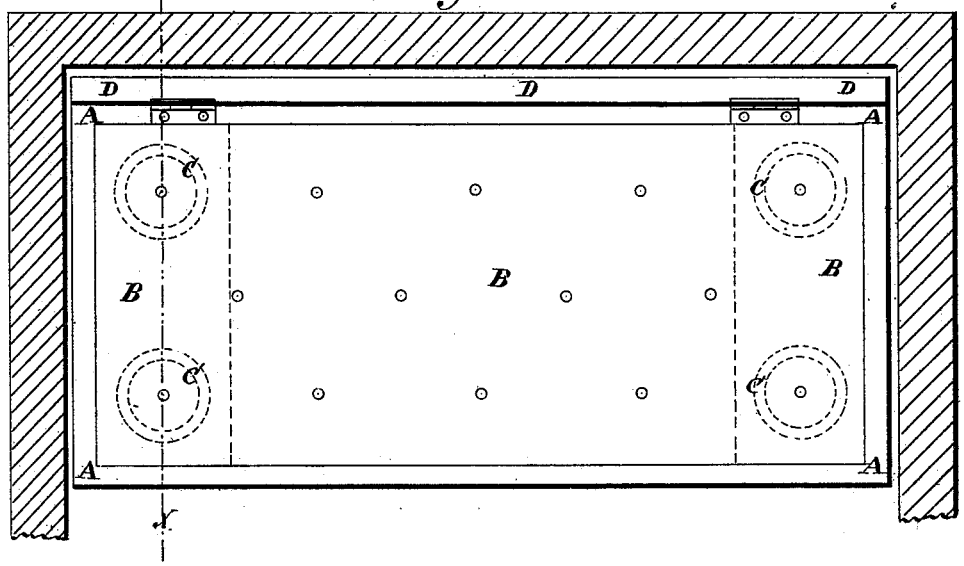
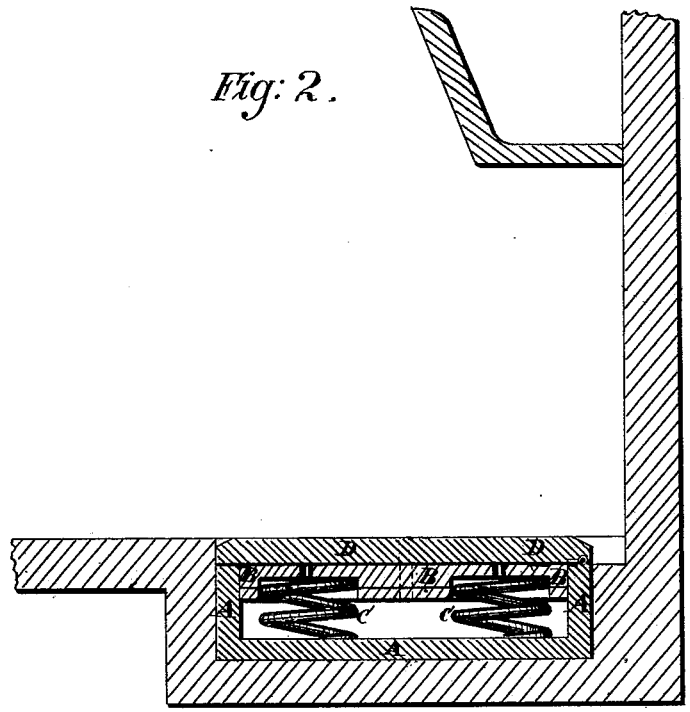

UNITED STATES PATENT OFFICE.

SILAS S. CROCKER AND ALBERT WILCOX, OF CLARENCE, IOWA.

IMPROVEMENT IN FOOT-BATHS FOR HORSES.

Specification forming part of Letters Patent No. 204,482, dated June 4, 1878; application filed May 10, 1878.

*To all whom it may concern:*

Be it known that we, SILAS S. CROCKER and ALBERT WILCOX, of Clarence, in the county of Cedar and State of Iowa, have invented a new and useful Improvement in Foot-Baths for Horses, of which the following is a specification:

Figure 1 is a top view of our improved bath, the hinged top being raised. Fig. 2 is a cross-section of the same, taken through the line $x$ $x$, Fig. 1.

Similar letters of reference indicate corresponding parts.

The object of this invention is to furnish an improved device by means of which a horse's feet may be bathed while he is standing in a stable, so as to prevent his feet from being injured by remaining too long dry, and which at the same time shall be simple in construction and convenient in use, enabling the horse to stand in his stall with wet or dry feet, as his owner may desire.

The invention consists in the foot-bath formed by the combination of the box or tank, the perforated movable top, the supporting-springs, and the hinged top with each other, as hereinafter fully described.

A is a box or tank, which is designed to be let into the floor of the stall near the manger in such a position that the horse's fore feet, or, if necessary, the hind feet also, may be in or over it when he is eating from the said rack or manger.

B is a top, which is made of such a size as to fit into and move up and down in the interior of the box or tank A, and which is supported by four or more spiral or other springs, C, attached to its lower side, or to cross-bars attached to said lower side, and which rest upon the bottom of the said box or tank A.

The springs C should be of such size and strength that the weight of the horse when standing with his feet upon the movable top B may be sufficient to depress the said top two or three inches.

The top B is perforated with numerous holes, as shown in Fig. 1, to allow the water in the tank A to pass through it freely.

D is a top or cover, which fits upon the upper edge of the box A, and which may be turned down upon the said box when it is desired to have the horse stand with dry feet. The cover or top D is hinged at its forward edge, so that it may be turned up beneath or against the manger when it is desired to have the horse stand with wet feet, in which case he rests his feet upon the perforated movable cover B, so that the water from the tank A may surround them.

Having thus described our invention, we claim as new and desire to secure by Letters Patent—

The foot-bath formed by the combination of the box or tank A, the perforated movable top B, the supporting-springs C, and the hinged top D with each other, substantially as herein shown and described.

SILAS S. CROCKER.
ALBERT WILCOX.

Witnesses:
GEO. E. SMITH,
J. W. NEELY.